(12) United States Patent
Komori

(10) Patent No.: US 8,200,611 B2
(45) Date of Patent: Jun. 12, 2012

(54) FILE SYSTEM AND DATA MANAGEMENT METHOD

(75) Inventor: Hiroyuki Komori, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 408 days.

(21) Appl. No.: 12/424,047

(22) Filed: Apr. 15, 2009

(65) Prior Publication Data

US 2009/0282091 A1 Nov. 12, 2009

(30) Foreign Application Priority Data

May 9, 2008 (JP) .................................. 2008-123651

(51) Int. Cl.
*G06F 12/00* (2006.01)
*G06F 17/30* (2006.01)
*G06F 12/02* (2006.01)

(52) U.S. Cl. ........... 707/205; 707/E17.01; 711/E12.001; 711/E12.002

(58) Field of Classification Search .................. 707/205, 707/E17.01; 711/E12.001, E12.002; 365/185.29, 365/148, 118; 714/E11.179, E11.084; 377/26; 702/165

See application file for complete search history.

(56) References Cited

U.S. PATENT DOCUMENTS

| | | | | |
|---|---|---|---|---|
| 5,832,493 A * | 11/1998 | Marshall et al. | ............... | 707/697 |
| 6,345,333 B1 * | 2/2002 | Sassa et al. | .................... | 711/103 |
| 7,035,967 B2 * | 4/2006 | Chang et al. | ................... | 711/103 |
| 7,246,139 B2 * | 7/2007 | Andoh | ........................... | 707/823 |
| 7,257,666 B2 * | 8/2007 | Komatsu et al. | ............... | 711/103 |
| 7,447,836 B2 * | 11/2008 | Zhang et al. | ................... | 711/113 |
| 7,594,087 B2 * | 9/2009 | Zeevi et al. | .................... | 711/165 |
| 2004/0098427 A1 * | 5/2004 | Peng | ............................. | 707/205 |
| 2009/0112950 A1 * | 4/2009 | Ejiri | ............................... | 707/205 |
| 2010/0023672 A1 * | 1/2010 | Gorobets et al. | ............... | 711/103 |

FOREIGN PATENT DOCUMENTS

| JP | 2005-157781 A | 6/2005 |
|---|---|---|
| JP | 2005-157781 A | 6/2006 |

* cited by examiner

*Primary Examiner* — Don Wong
*Assistant Examiner* — Lynda Dinh
(74) *Attorney, Agent, or Firm* — Arent Fox LLP

(57) ABSTRACT

A file system includes: a data controller that inverts logic of input data to convert the input data into accumulation data; a nonvolatile storage that has storage areas in which the accumulation data is stored and a table section to which use states of the storage areas are written; and a controller that controls the nonvolatile storage so as to store the accumulation data in the storage areas in accordance with the use states written to the table section.

6 Claims, 13 Drawing Sheets

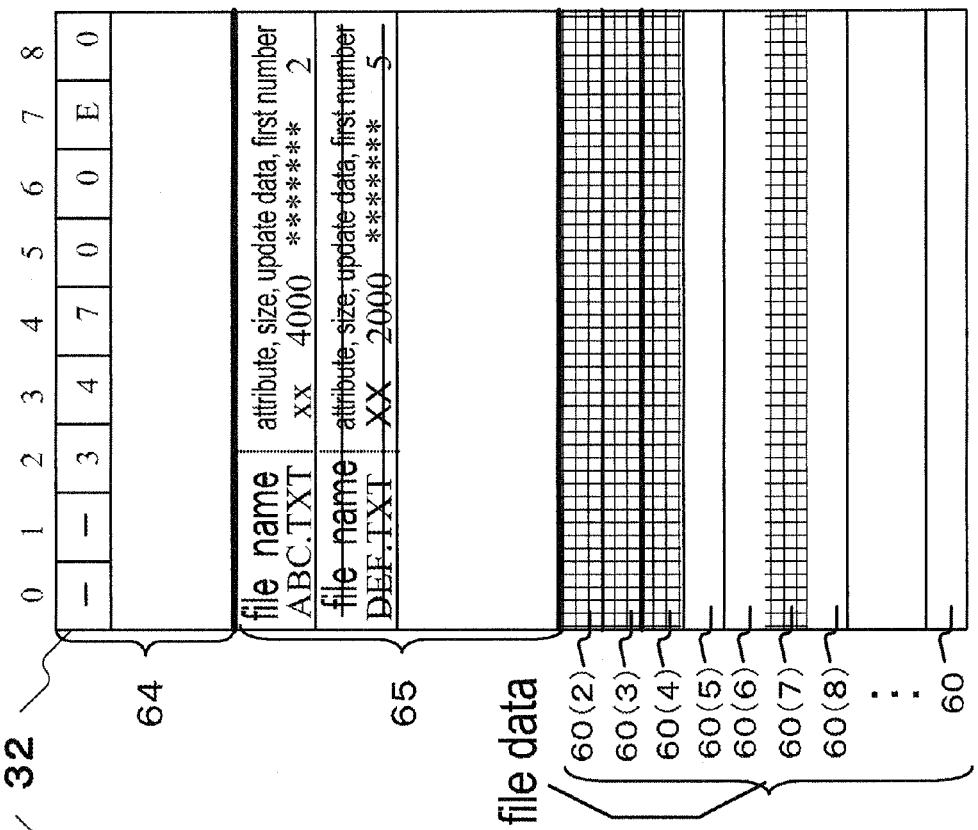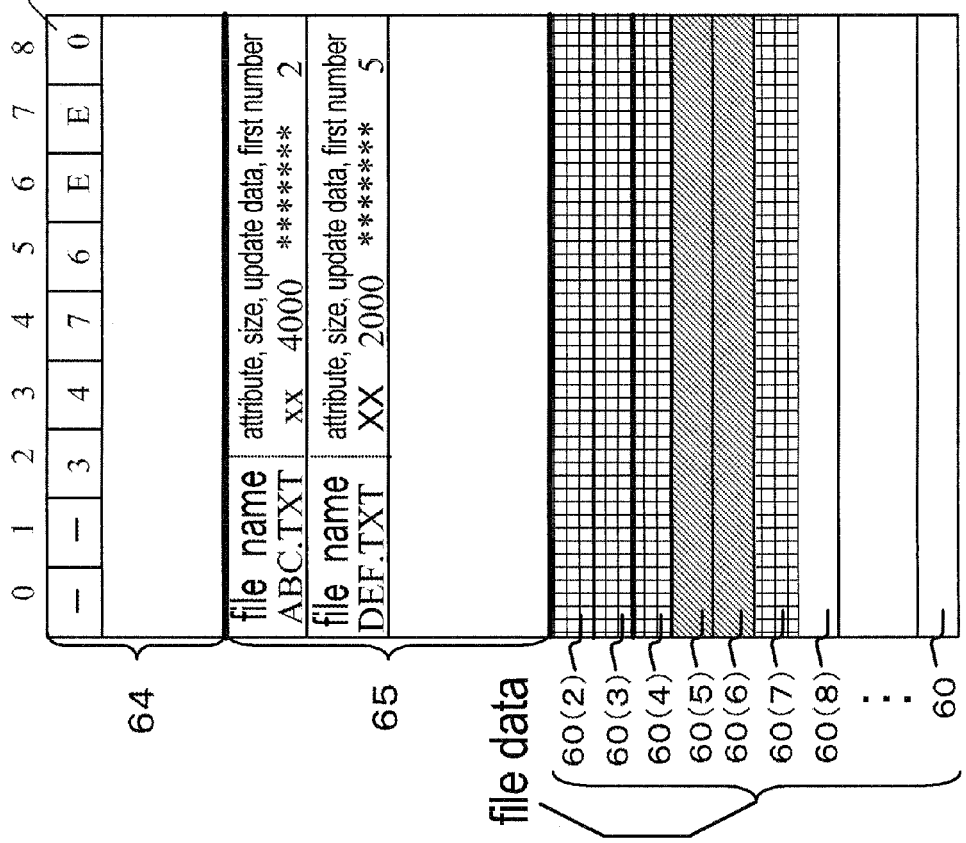

FIG.7A

| 0000 0000 0000 FFF9 |
|---|
| FFF8 FFF7 0007 0000 |
| ••• |

| 0000 0000 0000 FFD9 |
|---|
| FFD8 FFD7 0007 0000 |
| ••• |

| 0000 0000 0000 FFB9 |
|---|
| FFB8 FFB7 0007 0000 |
| ••• |

61, 61, 61

64

⇧ reuse

FIG.7B

| FFFF FFFF FFFF FFF9 |
|---|
| FFF8 FFF7 0007 FFFF |
| ••• |

| 0000 0000 0000 FFD9 |
|---|
| FFD8 FFD7 0007 0000 |
| ••• |

| 0000 0000 0000 FFB9 |
|---|
| FFB8 FFB7 0007 0000 |
| ••• |

⇧ reuse

FIG.7C

| FFFC FFFB 0007 FFF9 |
|---|
| FFF8 FFF7 0007 0000 |
| ••• |

| FFFF FFFF FFFF FFD9 |
|---|
| FFD8 FFD7 0007 FFFF |
| ••• |

| 0000 0000 0000 FFB9 |
|---|
| FFB8 FFB7 0007 0000 |
| ••• |

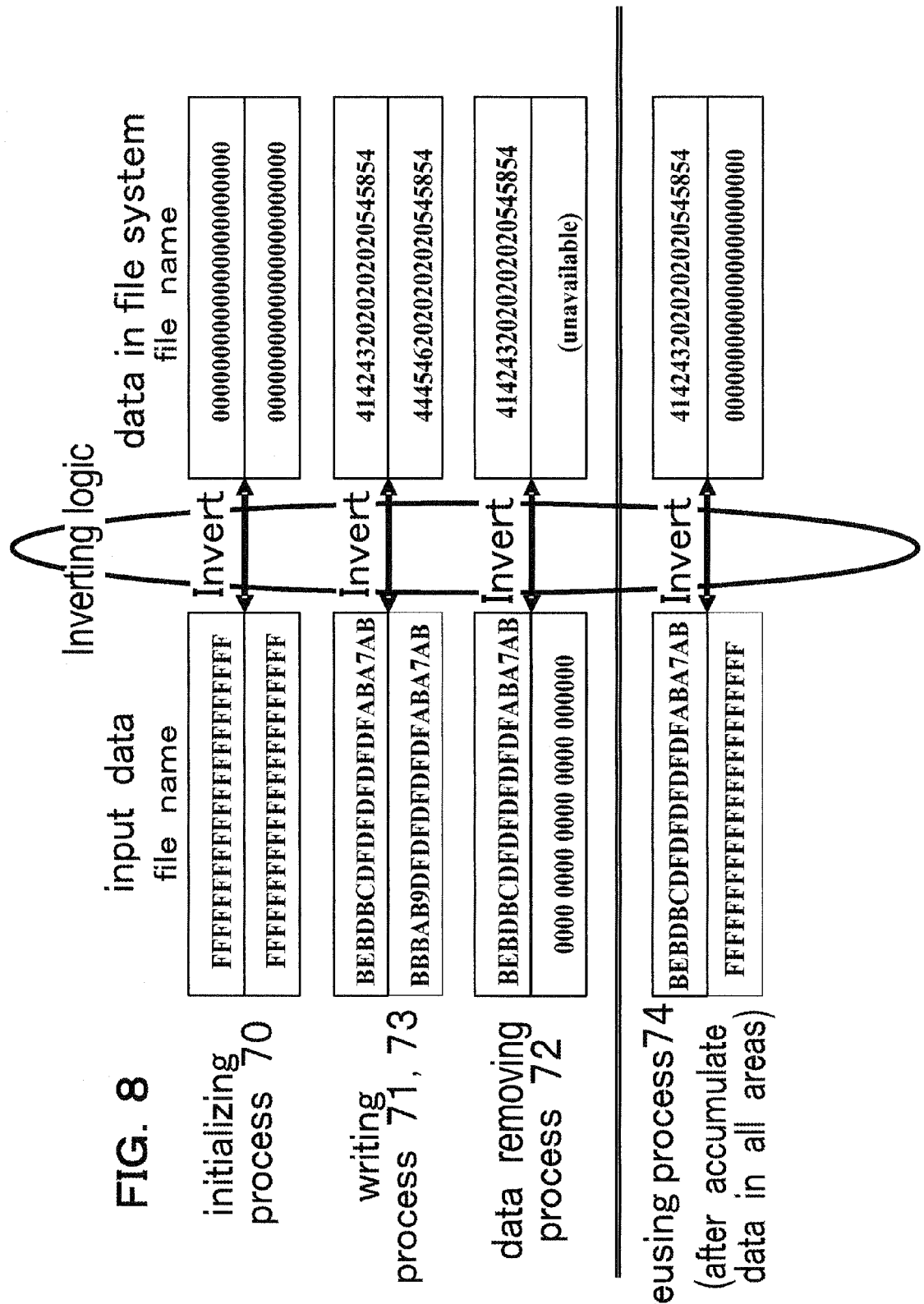

FIG.10

| cluster number 61-1 | 2 3 4 5 6 7 8 9 |
| cluster number 61-2 | 10 11 12 13 14 15 16 17 write |
| cluster number 61-3 | 18 19 20 21 22 23 24 25 |
| cluster number 61-4 | 26 27 28 29 30 31 32 33 write | table section 64

| 0003 | 0004 | 0005 | FFF8 | 0000 | 0000 | 0000 | 0000 |
|---|---|---|---|---|---|---|---|
| 000B | 000C | 000D | 000E | 000F | 0010 | 0011 | 001A |
| 0000 | 0014 | 0015 | 0016 | FFF8 | 0018 | FFF8 | 0000 |
| 001B | 001C | 001D | 001E | FFF8 | 0000 | 0000 | 0000 | erasure-area management table 31

| number | blank | number of files used |
|---|---|---|
| #1 | ○ | 1 |
| #2 | ○ → × | 0 → 1 |
| #3 | ○ | 2 |
| #4 | ○ | 0 → 1 |

FILE SYSTEM AND DATA MANAGEMENT METHOD

CROSS REFERENCE TO RELATED APPLICATION

This application is based upon and claims the benefit of priority from the prior Japanese Patent Application NO. 2008-123651 filed on May 9, 2008, the entire contents of which are incorporated herein by reference.

BACKGROUND

1. Field

The present invention relates to a file system using a flash memory and a data management system for the file system.

2. Description of the Related Art

With increasing storage capacities of individual flash memories, consumer equipment and industrial equipment that use built-in or connected file systems using flash memories as main storages are increasingly used. Of such file systems, FAT file systems having the so-called "FAT (file allocation table)" are often used as file systems used for equipment (e.g., personal computers) that handles data for each file.

The term "FAT" refers to a file management table provided in a memory area in a flash memory in order to improve the management efficiency during management of data as a file. When a file is regarded as a group of data, i.e., as being constituted by clusters, the FAT can also be referred to as a "cluster management table".

The FAT file system is a file system that has, in the memory area, a file storage area and a file management table and that manages the use states of clusters.

When "0" is written in an area in the file management table, this means that a cluster corresponding to the area is not in use, and when a numeral other than "0" is written, this means that a corresponding cluster is in use. The FAT file system manages a file in accordance with the use states of the clusters.

With this arrangement, when a cluster in the file storage area is changed from a non-use state to a use state, it is necessary to change any of bits in areas in the file management table to "1".

On the other hand, in the flash memory, a state in which "1" is written indicates an erasure state (In other words, only erasure changes to "1"), and is changed to "0" upon written of data.

With this arrangement, when the in-use state (the state in which "0" is written to any of the table area) is changed to the non-use state (the state in which all bits in the table area are "1"), the flash memory needs to perform a data erasure operation.

Erasure in the flash memory is performed for each unit having a certain size, and a cluster use-state-indicating area in the file management table is smaller than the area of erasure unit. Thus, the erasure unit includes multiple use-state-indicating areas.

Thus, in order to write the use state of a new cluster to in the file management table area, it is necessary to save data in the file management table area, perform erasure to temporarily change all bits to "1, additionally write the use state of the new cluster to the saved file management area data, and then write back the data.

If one use-state-indicating area is provided for each erasure unit in order to reduce the number of data erasures, the area occupied by the file management table, the area being located in the flash memory, increases, and thus the use efficiency declines.

If, however, multiple use-state-indicating areas are provided for each erasure unit, erasure and writing are repeated every time data is modified. This means that the erasure operation and the writing operation concentrate on a particular erasure unit. As a result, the erasure unit deteriorates faster than other portions.

When a large number of portions with "0" exist in bits that constitute data, it is proposed to write, to the flash memory, data by inverting the logic of bits that constitute the data. This arrangement can delay deterioration for each erasure (e.g., refer to Japanese Laid-open Patent Publication Nos. 2005-157781 and 11-25002).

When the logic of bits that constitute data is inverted and the resulting data is written to the flash memory, the number of writing operations decreases. However, the number of erasures does not decrease.

SUMMARY

One aspect of the embodiments provides a file system. The file system include: a data controller that inverts logic of input data to convert the input data into accumulation data; a nonvolatile storage that has storage areas in which the accumulation data is stored and a table section to which use states of the storage areas are written; and a controller that controls the nonvolatile storage so as to store the accumulation data in the storage areas in accordance with the use states written to the table section.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF THE DRAWINGS

FIGS. 5A and 5B show the contents of the clusters arranged in the order of addresses in an accumulation-data writing state and an accumulation-data removing state, respectively;

FIGS. 7A to 7C show reuse of a table section;

FIG. 8 is a diagram showing how data in an entry section are processed in processes;

FIG. 10 shows a state in which files are further written to the FAT-file system area in addition to the file writing state shown in FIG. 9;

DESCRIPTION OF THE PREFERRED EMBODIMENTS

First, second, and third embodiments of the present invention will be described below. The present invention is not limited to the particular embodiments.

[First Embodiment]

A first embodiment is directed to a file system (incorporation equipment). The file system includes a data controller that inverts logic of input data to convert the input data into accumulation data, a nonvolatile storage that has storage areas in which the accumulation data is stored and a table section to which use states of the storage areas are written, and a controller that controls the nonvolatile storage so as to store the accumulation data in the storage areas, in accordance with the use states written to the table section.

Figure 1:
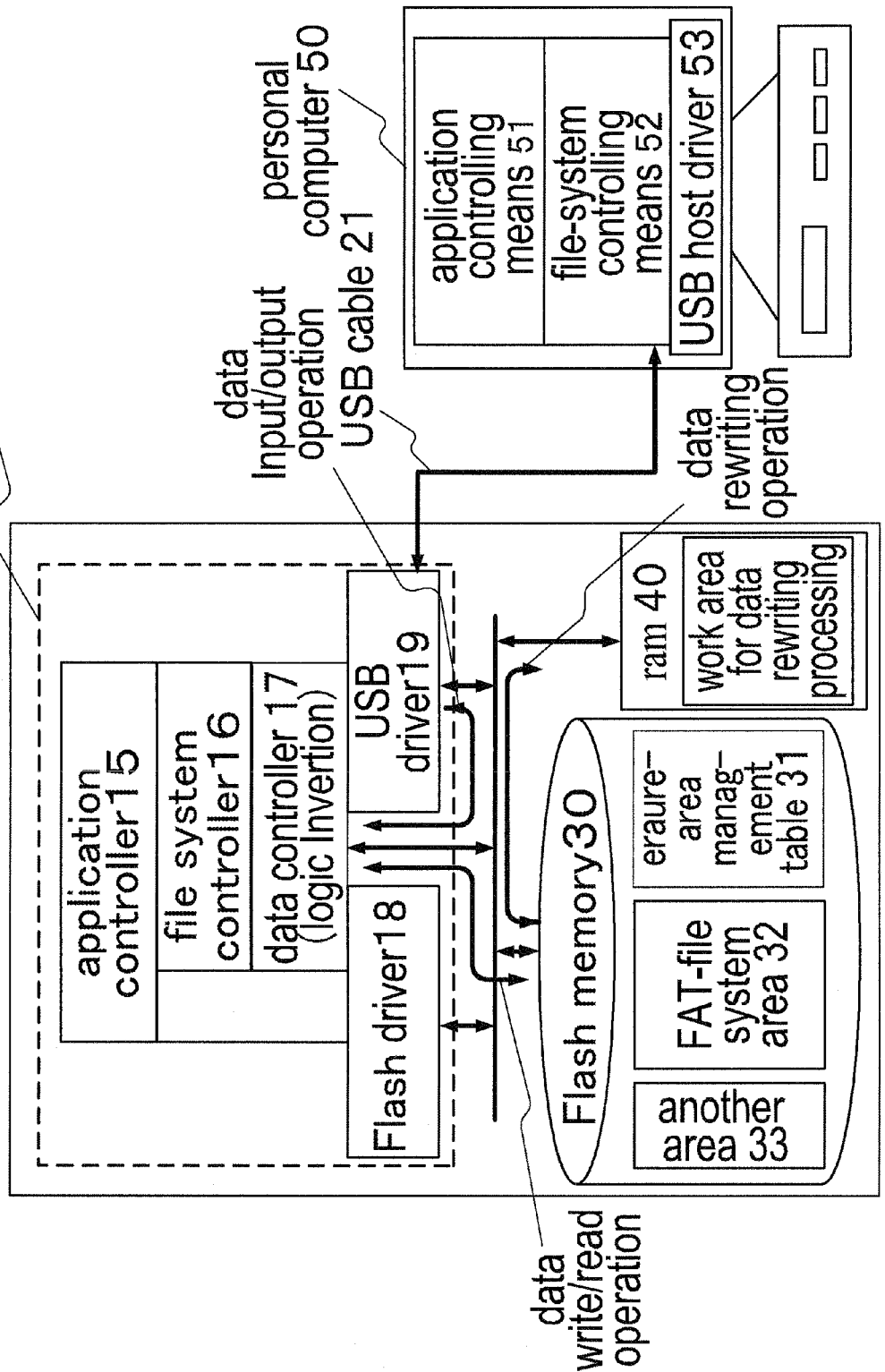
FIG. 1 shows a file system according to a first embodiment of the present invention and a personal computer that outputs/inputs data to/from the file system.

FIG. 1 shows a file system 10 (incorporation equipment) according to the first embodiment and a personal computer 50 that outputs/inputs data to/from the file system 10.

In FIG. 1, the file system 10 includes a flash memory 30, an application controller 15, a file system controller 16, and a data controller 17. However, the controllers 15, 16, and 17 may be eliminated when the file system 10 is an external storage device such as an USB (universal serial bus) memory connected to the personal computer 50 through a USB. In such a case, the personal computer 50 has application controlling means 51, file-system controlling means 52, and a USB host driver 53 to perform control that is similar to that performed by the application controller 15, the file system controller 16, and the data controller 17. That is, the application controlling means 51 serves to control an application that is included in the file system 10. The file-system controlling means 52 is capable of reading data in the file system 10 through a USB and performs control that is similar to that performed by the file-system controller 16. The USB host driver 53 serves as controlling means for controlling input/output data between the file system 10 and the personal computer 50 which are connected through the USB and for performing control that is similar to that performed by the data controller 17.

On the other hand, when the file system 10 operates independently as a file system, the file system 10 includes a controller 12, the flash memory 30, and a RAM (random access memory) 40. In this case, the application controller 15, the file system controller 16, and the data controller 17, which are included in the controller 12, controls operation of the file system 10, as described below. The flash memory 30 is a nonvolatile memory and includes an erasure-area management table 31, a FAT-file system area 32, and another area 33. The FAT-file system area 32 has storage areas for accumulation data and a table section that indicates use states of the storage areas. Each use state indicates whether an area (a cluster) in which accumulation data is stored is in an initial state, is in a state in which the area was previously used (but is not used now), or is in a state in which the area is currently used. The another area 33 stores data regarding operation setting performed by a user. The erasure-area management table 31 manages a state of a data file constituted by accumulation data. In the flash memory 30, the state of "1" (bit on) represents an erasure state, and the state of "0" (bit off) represents a program state. The circuitry of the flash memory 30 is designed so that it puts erasure areas in a predetermined range into erasure states at a time to erase bit data. A state immediately after the erasure state corresponds to the initial state.

The controller 12 includes the application controller 15, the file system controller 16, the data controller 17, the flash driver 18, and the USB driver 19.

The application controller 15 controls an application for operating the file system 10, and manages writing/reading data to/from the another area 33, as needed.

The file-system controller 16 manages writing/reading data to/from the FAT-file system area 32 and the erasure-area management table 31. The file-system controller 16 has means for controlling, in the initial state, the data controller 17 so as to put all bits in a accumulation-data storage section and the table section into the "1" (bit on) states. The file system controller 16 has means for controlling the data controller 17 so as to put, as the use states, all bits in the table section which correspond to previously used storage areas into "0" (bit off) states and so as to put, as the use states, bits in the table section which correspond to currently used storage areas into "0" (bit off) states. During storage of accumulation data to the FAT-file system area 32, the file system controller 16 has means for performing control so as to select storage areas while avoiding areas whose use states indicated by the table section are previously used states or currently used states and so as to write the accumulation data to the selected storage areas. The file system controller 16 has means for controlling the data controller 17 so as to erase the accumulation-data storage section and the table section after putting all storage-data storage section and the table section into the use states.

The data controller 17 controls data writing/writing in accordance with instructions from the application controller 15 and the file system controller 16. The data controller 17 inverts the logic of data input from the USB driver 19 and outputs the resulting data to the flash memory 30. Conversely, the data controller 17 inverts the logic of data output from the flash memory 30 and outputs the inverted data to the USB driver 19. The data controller 17 further controls processing for data rewriting from the flash memory 30 to the RAM 40.

Under the control of the data controller 17, the flash driver 18 controls an operation regarding input/output of data to/from the flash memory 30. The flash driver 18 also includes a memory driver. The memory driver controls an operation regarding input/output data to/from the RAM 40 during data rewriting processing of the flash memory 30. The RAM 40 has a work area for performing the data rewriting processing of the flash memory 30.

During data rewriting operation 28 of the flash memory 30, data is transmitted between the flash memory 30 and the RAM 40 through a bus 34. During data input/output operation 26 from the personal computer 50 through the USB, data is transmitted between the USB driver 19 and the data controller 17 through the bus 34. During data write/read operation 27, data is transmitted between the data controller 17 and the flash memory 30 through the bus 34.

Data writing/reading between the file system 10 and the personal computer 50 is performed through a USB cable 21.

As described above, the file system 10 according to the first embodiment includes the data controller 17 that inverts the logic of input data to convert the input data into accumulation data, the nonvolatile storage (the flash memory 30) that has storage areas for storing the accumulation data and a table section to which the use states of the accumulation-area storage areas are written, and the controller (the file system controller 16) that controls the accumulation-data storage areas as described below in accordance with the use states written to the table section. In the initial state, the controller (the file system controller 16) in the file system 10 according to the first embodiment puts the table section into "1" (bit on) states. The controller (the file system controller 16) in the file system 10 according to the first embodiment puts, as the use states, all bits in the table section which correspond to previously used storage areas into "0" (bit off) states and put, as the use states, bits in the table section which correspond to currently used storage areas into "0" (bit off) states. The controller (the file system controller 16) in the file system 10 according to the first embodiment writes accumulation data while avoiding areas that were used or are currently used. In addition, the controller (the file system controller 16) in the file system 10 according to the first embodiment is a file system for performing control so as to erase accumulation data in the accumulation-data storage areas after all the table section and the accumulation-data storage areas are put into states in which they were previously used or are currently used.

In order to store accumulation data in a nonvolatile memory, the states of "0" (bit off) in the accumulation data must be programmed. Thus, during rewriting of accumulation data, accumulation data is temporarily saved to a rewriting-processing work area in the RAM 40 and erasure areas containing the accumulation data are erased, and then the states of "0" (bit off) corresponding to the rewritten accumulation data are programmed. With this arrangement, when the rewritten accumulation data is stored in the same area in the accumulation-data storage section, the erasure operation is concentrated on the particular area. As a result, the number of erasures of the nonvolatile memory increases and the data storage capability of the erasure area declines.

In the file system 10 according to the first embodiment, every time accumulation data is rewritten, the accumulation-data storage area shifts in accordance with a use state written in the table section. With this arrangement, without performing the erasure operation on the same portion in which the accumulation data is stored, the erasure operation is performed after all areas in the accumulation-data storage section are used. Portions in which the "0" (bit off) states are programmed also do not concentrate on one portion in the table section. This is because the portion in which accumulation data is to be stored shifts sequentially and thus a table section corresponding to the shifted portion also shifts. Thus, in the table section, after all areas in the table section are used, the erasure operation is performed on erasure areas in the table section.

As a result, without concentration of the erasure operation on portions in the storage areas or the table section, the erasure operation is performed after all areas in the accumulation-data storage section are used. Thus, the number of erasures of each erasure area is reduced and deterioration of each erasure unit is delayed.

A case in which when bits in the accumulation-data storage section and the table section are put into the "0" (bit-off) states (i.e., program states) in the initial state, input data is written to the file system 10 without inverting the input data will now be discussed as a first case. An area in which accumulation data is stored is relatively smaller than an erasure area. Thus, in order to hold adjacent data, the adjacent data needs to be saved to a rewriting-processing area in the RAM 40. Thereafter, erasure needs to be performed and the input data needs to be written together with the adjacent data. This operation requires an excess amount of time during data inputting and thus large mounts of load are exerted on the accumulation-data storage section and the table section.

Next, a case in which when bits in the accumulation-data storage section and the table section are put into the "1" (bit-on) states, input data is written to the file system 10 without inverting the input data will be discussed as a second case. In this case, a state in which no data is written should be recognized as "0". Thus, during data reading from the file system 10, when data is to be read from an area in which no accumulation data is stored, it is necessary to perform an operation to identify an area in which no data is written and to read "0".

Next, a case in which, when bits in the accumulation-data storage section and the table section are put into the "1" (bit-on) states, input data is inverted and is written to the file system 10 will be discussed as a third case. In this case, when accumulation data is to be additionally written, it is sufficient to only add "0" (bit off) state (the program state). Thus, this approach does not have a disadvantage in the erasure, unlike the first case. Also, since data is inverted for reading, "0" can be read without identification of an area in which no data is written, and thus there is no disadvantage as in the second embodiment.

Thus, as in the file system in the first embodiment, when accumulation data is to be rewritten and new storage data is to be stored while avoiding storage areas whose use states are previously used states or are currently used states, it is desired to invert input data to convert the input data into accumulation data during the shift of an area in which the accumulation data is to be stored.

[Second Embodiment]

A second embodiment is directed to a data management method for the file system 10 according to the first embodiment. The management method according to the second embodiment includes: a process in which "1" is written to all bits belonging to, at least, the accumulation-area storage section 66 and the table section 64 in the initial state; a process in which accumulation data is stored in the clusters 60 while avoiding the clusters 60 corresponding to use-state-indicating areas in which "0" is written in the table section 64; a process in which use-state data is written to the table section 64; and a process in which, when accumulation data is removed from the clusters 60, "0" is written to all use-state-indicating areas in the table section 64.

Figure 2:
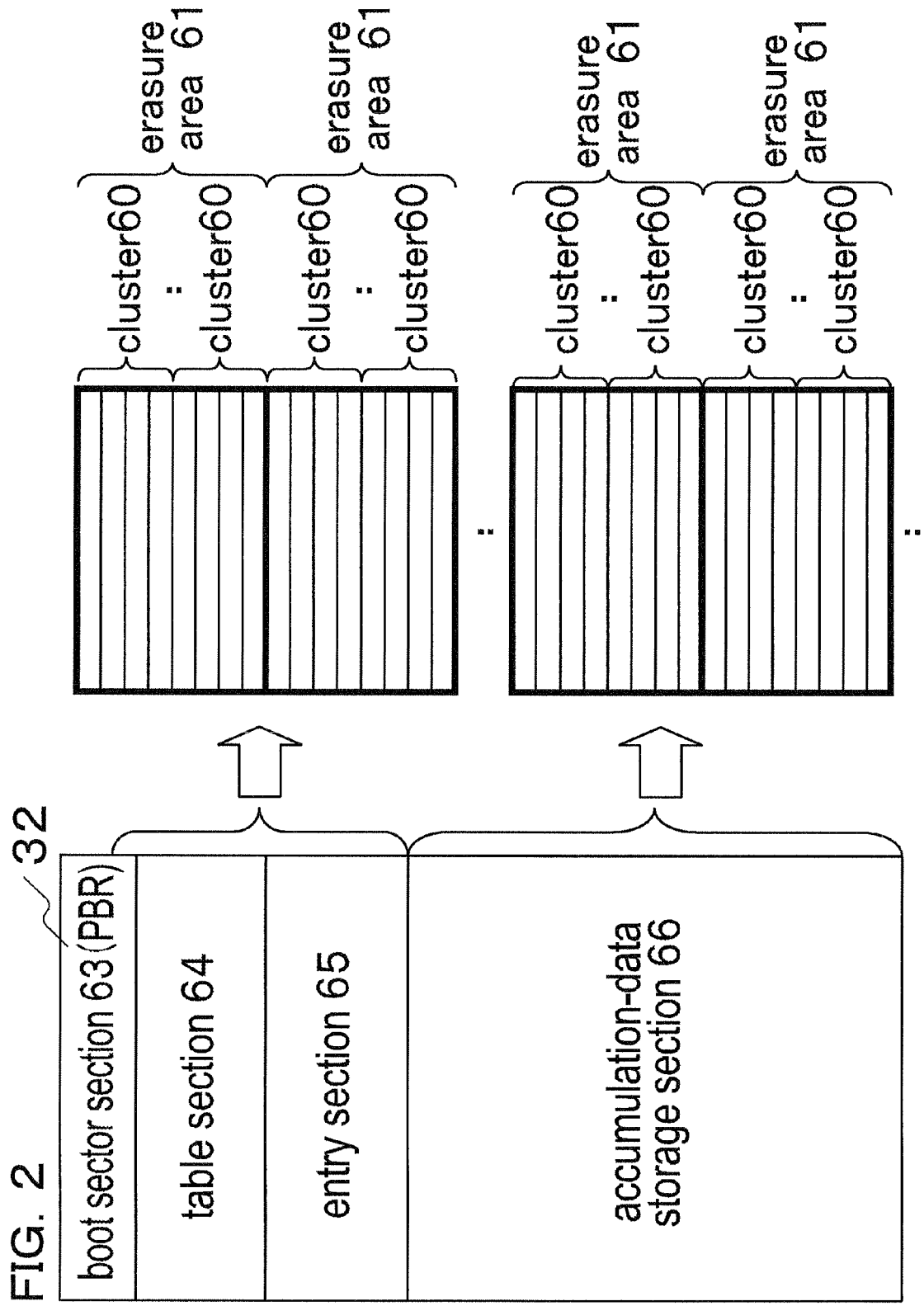
FIG. 2 shows clusters in a FAT-file system area (shown in FIG. 1) in the order of addresses.

FIG. 2 shows unit areas in a storage area in the FAT-file system area 32 described in the first embodiment, i.e., the clusters 60 in the order of addresses.

The FAT-file system area 32 has a boot sector section 63, the table section 64, an entry section 65, and the storage-data storage section 66.

The boot sector section 63 contains management information regarding the entire FAT-file system area 32. The table section 64 follows the boot sector section 63 and is the same as the one shown in FIG. 1. The entry section 65 follows the table section 64 and is an area containing management information for files constituted by accumulation data. The accumulation-data storage section 66 follows the entry section 65 and is the same as the one shown in FIG. 1.

The FAT-file system area 32 includes multiple erasure areas 61. Each erasure area 61 includes multiple clusters 60. Each cluster 60 includes multiple sectors 62.

Figure 3:
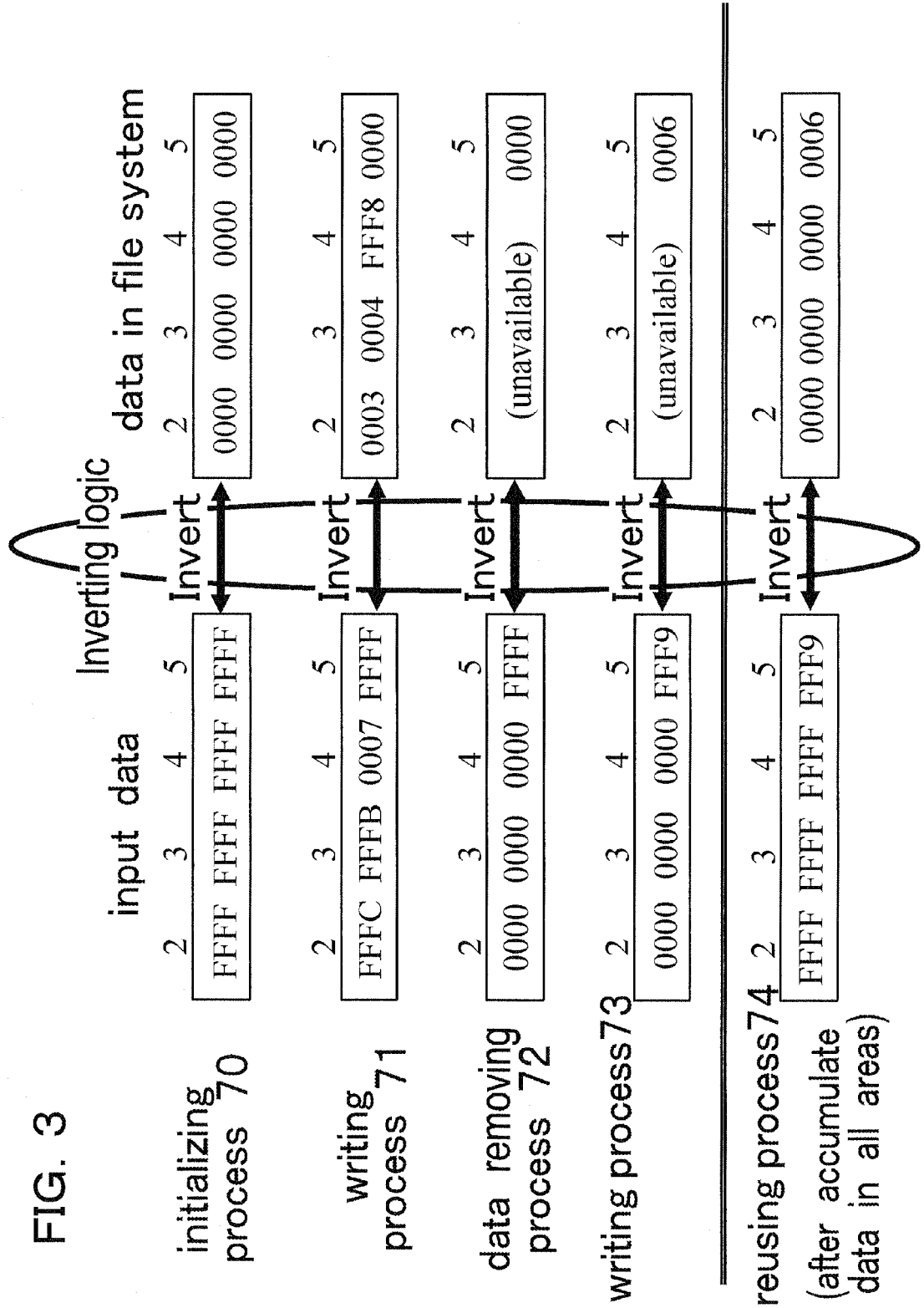
FIG. 3 shows a management method according to a second embodiment of the present invention.

The management method according to the second embodiment will now be described with reference to FIG. 3. As shown in FIG. 3, the management method according to the second embodiment includes an initializing process 70, a writing process 71, a data removing process 72, and a writing process 73. In the initializing process 70, in the initial state, "1" is written to all bits belonging to the accumulation-area storage section 66 and the table section 64. In the data removing process 72, during removing of accumulation data from the clusters 60, "0" is written to all use-state-indicating areas corresponding to the clusters 60 from which the accumulation data is removed, the use-state-indicating areas being located in the table section 64. In the writing processes 71 and 73, clusters 60 in which accumulation data is to be stored are selected while avoiding clusters 60 corresponding to the use-state-indicating areas in which "0" is written in the table section 64, the accumulation data is stored in the clusters 60, and use-state data is written to the table section 64.

The management method according to the second embodiment further includes a reusing process 74 in which, when all areas in the accumulation-data storage section 66 and the table section 64 are in states in which they were previously used or are currently used, the areas are reused.

FIG. 3 shows the state of input data and the state of data in the file system 10 in each process. Numerals "2", "3", "4", and "5" indicate addresses of the clusters 60. The state in each process in FIG. 3 is illustrated assuming that the number of clusters 60 is four, and details thereof are described below with reference to FIGS. 4 to 7C. The addresses shown in FIG. 3 are expressed in four bits in binary form. However, when the numerals of the addresses are greater than 10, they are expressed by A, B, C, D, E, and F in that order. That is, writing "1" to all 4 bits is expressed by "F".

In the initializing process 70, input data "FFFF FFFF FFFF FFFF" is input to the clusters 60 with addresses 2, 3, 4, and 5, whereas "0000 0000 0000 0000" is input to the file system 10.

In the writing process 71, input data "FFFC FFFB 0007 FFFF" is input to the clusters 60 with addresses 2, 3, 4, and 5, whereas "0003 0004 FFF8 0000" is input to the file system 10.

In the data removing process 72, when input data "0000 0000 0000 FFFF" is input to the clusters 60 with addresses 2, 3, 4, and 5, no data is input to the clusters 60 with addresses 2 to 4, and "0000" is input to the cluster 60 with address 5 in the file system 10, because the data "0000 0000 0000" in the cluster 60 with addresses 2,3,4 means that the region represented by addresses 2,3,4 in the cluster 60 is not available for writing.

In the writing process 73, input data "0000 0000 0000 FFF9" is input to the clusters 60 with addresses 2, 3, 4, and 5, whereas "0006" is input to the cluster 60 with address 5 in the file system 10 and no data is input to the clusters 60 with addresses 2 to 4.

It can be understood from the above description that data input to the file system 10 is data obtained by inverting the logic of the input data, the inverting being performed by the data controller 17.

Figure 4:
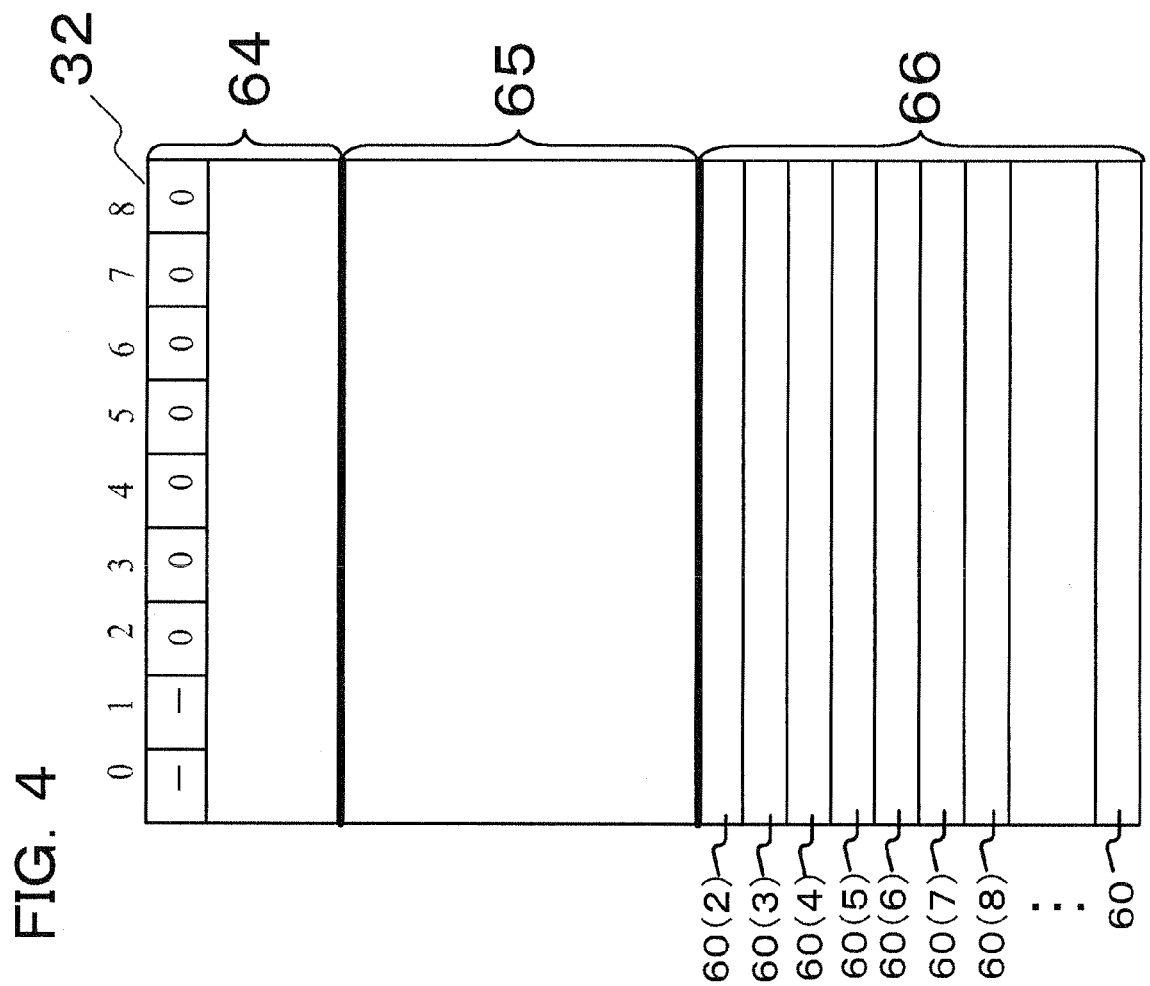
FIG. 4 shows the contents of the clusters arranged in the order of addresses in an initial state.

FIG. 4 shows the contents of the clusters 60 arranged in the order of addresses in the initial state, FIG. 4 shows the table section 64, the entry section 65, and the accumulation-data storage section 66. The table section 64 has areas 0 to 8. Logic "0" is written to the areas 2 to 8 in the table section 64, when viewed as data input to the file system 10. That is, logic "1" is written when viewed as data input to the flash memory 30. The clusters 60(2) to 60(8) are, of the clusters 60, clusters corresponding to the areas 2 to 8 in the table section 64.

Now, the initializing process 70 in which "1" is written to all bits belonging to the accumulation-data storage section 66 and the table section 64 in the initial state will be described with reference to FIGS. 3 and 4.

The initializing process 70 shown in FIG. 3 is a process in which "1" is written to all bits belonging to the accumulation-data storage section 66 and the table section 64 in the initial state of the file system 10, when viewed as input data input to the flash memory 30.

FIGS. 5A and 5B show the contents of the clusters 60 arranged in the order of addresses in an accumulation-data writing state and an accumulation-data removing state, respectively. The clusters 60(2) to 60(8) are, of the clusters 60, clusters corresponding to the areas 2 to 8 in the table section 64.

FIG. 5A shows that accumulation data is written in the second to seventh clusters 60 in the accumulation-data storage section 66. Information regarding two files constituted by the accumulation data is written to the entry section 65. Examples of the information include a file name, a file attribute, a file size, update date, and the number of the first cluster 60. The areas 2 to 7 in the table section 64 indicate the use states of the clusters 60(2) to 60(7). First, "3" is stated in the area 2 to indicate that a file is stored starting from the second cluster 60 and subsequent data is stored in the third cluster 60. Next, "4" is stated in the area 3 to indicate that subsequent data is stored in the fourth cluster 60. Next, "7" is stated in the area 4 to indicate that subsequent data is stored in the seventh cluster 60. Next, "E" is stated in the area 7 to indicate that data that constitutes the file ends in the seventh cluster 60. That is, the clusters 60(2), 60(3), 60(4), and 60(7) are hatched with cross stripes and indicate that data that constitutes the same file is stored therein.

Further, "6" is stated in the area 5 to indicate that subsequent data of the second file is stored in the sixth cluster 60. "E" is stated in the area 6 to indicate that data contained in the second file ends in the sixth cluster 60. That is, the clusters 60(5) and 60(6) are hatched with oblique lines and indicate that data that constitutes the same file is stored therein.

FIG. 5B shows that the second file is erased from the accumulation-data storage section 66. The entry section 65 indicates that information regarding the second file is erased. In addition, "0" is written to the areas 5 and 6 in the table section 64 to indicate that the accumulation data regarding the second file, the accumulation data having being stored in the fifth and sixth clusters 60, is erased. That is, the clusters 60(5) and 60(6) are not hatched and indicate that no data is written therein.

Now, the data removing process 72 in which, during removing of accumulation data from the clusters 60, "0" is written to all use-state-indicating areas in the table section 64 which correspond to the clusters 60 from which the accumulation data is removed will now be described with reference to FIGS. 3 and 5A and 5B.

That is, the data removing process 72 shown in FIG. 3 is a process in which, when viewed as data input to the flash memory 30, "0" is written to the clusters 60 from which the accumulation data is removed and bits belonging to areas in the table section 64 which correspond to the clusters 60 from which the accumulation data is removed. On the other hand, when viewed as data input to the file system 10, "1" is written to the clusters 60 and the corresponding areas in the table section 64.

Figure 6A:
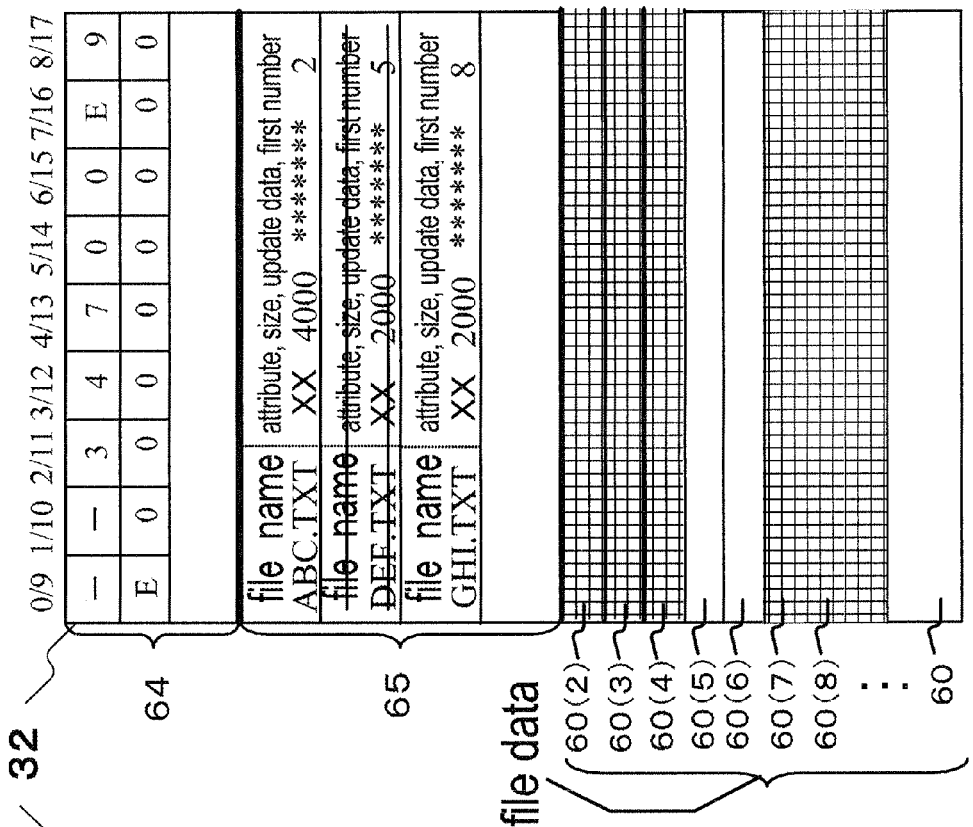
FIGS. 6A and 6B show the contents of the clusters arranged in the order of addresses in an accumulation-data additional writing state.
Figure 6B:
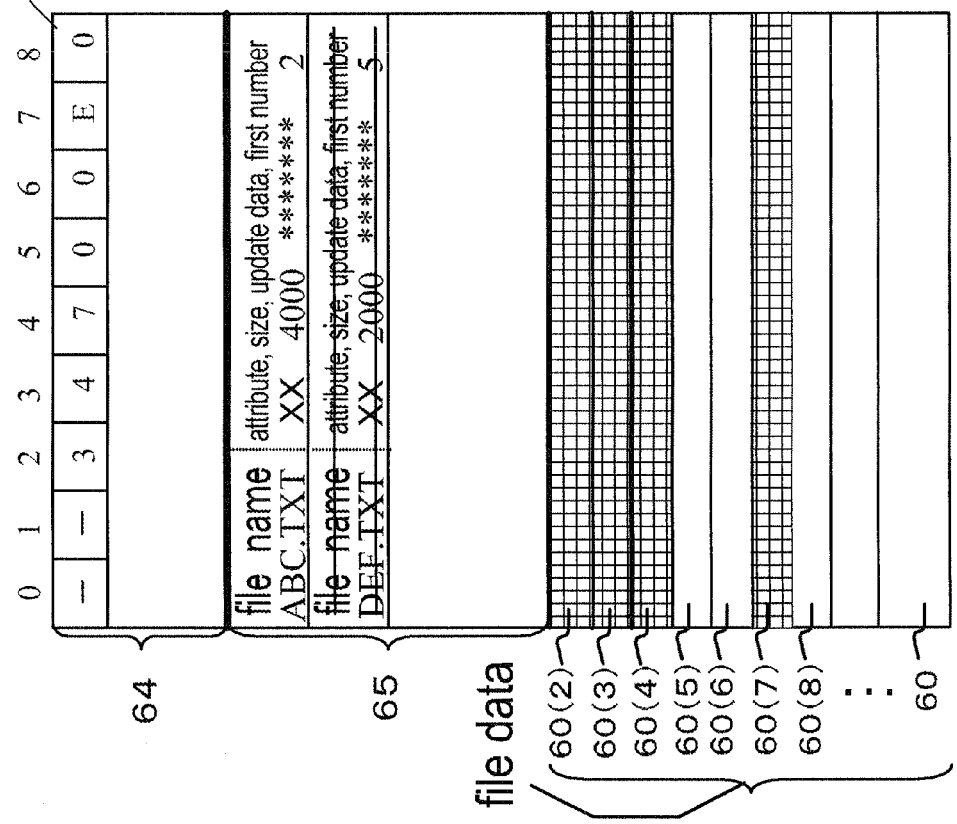

FIGS. 6A and 6B show the contents of the clusters 60 arranged in the order of addresses in a state in which accumulation data is additionally written. The clusters 60(2) to 60(8) are, of the clusters 60, clusters corresponding to areas 2 to 8 in the table section 64.

FIG. 6A shows that the second file is erased from the accumulation-data storage section 66. The entry section 65 indicates that information regarding the second file is erased. In addition, "0" is written to the areas 5 and 6 in the table section 64 to indicate that accumulation data regarding the second file, the accumulation data having being stored in the fifth and sixth clusters 60, is erased. That is, the clusters 60(2), 60(3), 60(4), and 60(7) are hatched with cross stripes and indicate that data that constitutes the same file is stored therein. The clusters 60(5) and 60(6) are not hatched and indicate that data is erased.

FIG. 6B shows a state in which accumulation data that constitutes an additional file is written to the FAT-file system area 32 when it is in the state shown in FIG. 6A. The accumulation-data storage section 66 indicates that accumulation data is written in the second to fourth clusters 60 and the seventh to ninth clusters 60. Information regarding two files constituted by the accumulation data is written in the entry section 65. Examples of the information include a file name, a file attribute, a file size, update date, and the number of the first cluster 60. The areas 2 to 9 in the table section 64 indicate the use states of the clusters 60(2) to 60(9). First, "3" is stated in the area 2 to indicate that a file is stored starting from the second cluster 60 and subsequent data is stored in the third cluster 60. Next, "4" is stated in the area 3 to indicate that subsequent data is stored in the fourth cluster 60. Next, "7" is stated in the area 4 to indicate that subsequent data is stored in the seventh cluster 60. "E" is stated in the area 7 to indicate that data contained in the file ends in the seventh cluster 60. Further, "0" is stated in the areas 5 and 6 to indicate that accumulation data in the fifth and sixth clusters 60 has been removed. Next, "9" is stated in the area 8 to indicate that subsequent data is stored in the ninth cluster 60. Next, "E" is stated in the area 9 to indicate that data contained in the file ends in the ninth cluster 60. That is, the clusters 60(2), 60(3), 60(4), and 60(7) are hatched with cross stripes and indicate that data that constitutes the same file is stored therein. The cluster 60(8) and the next cluster 60 are hatched with oblique lines and indicate that data that constitutes the same file is stored. In addition, the clusters 60(5) and 60(6) are not hatched with oblique lines and indicate that data has been erased.

The file constituted by the accumulation data stored in the eighth to ninth clusters 60 is an additional file added after the accumulation data stored in the fifth and sixth clusters 60 is erased. The size of the additional file is the same as the erased file constituted by the erased accumulation data. However, since "0" is written in the areas 5 and 6 in the table section 64 which correspond to the fifth and sixth clusters 60, the clusters 60 in which accumulation data is to be stored is selected while avoiding the fifth and sixth clusters 60 and the accumulation data for the additional file is written to the eighth and ninth clusters 60.

With reference to FIGS. 3 and 6A and 6B, a description is now given of the writing processes 71 and 73 in which the clusters 60 in which accumulation data is to be stored are selected while avoiding the clusters 60 corresponding to the use-state-indicating areas in which "0" is written in the table section 64, the accumulation data is stored in the selected clusters 60, and use state data is written to the table section 64.

That is, the data writing processes 71 and 73 shown in FIG. 3 are processes in which the clusters 60 in which accumulation data is to be stored are selected while avoiding the clusters 60 corresponding to the use-state-indicating areas in which "0" is written in the table section 64, and the accumulation data is stored in the selected clusters 60.

A description is now given of the reusing process 74 with reference to FIGS. 3 and 7A to 7C. In the reusing process 74, when all areas in the accumulation-data storage section 66 and the table section 64 are in states in which they were previously used or are currently used, the areas are reused.

FIGS. 7A to 7C show reuse of the table section 64 is reused. FIGS. 7A to 7C show an example in which the table section 64 is constituted by three erasure areas 61.

FIG. 7A shows that the three erasure areas 61 are areas that were previously used or are currently used. For example, areas in which "0" is written in the upper erasure area 61 indicate that accumulation data is removed from the corresponding clusters 60. That is, areas in which "0" is written are areas that were previously used. Other areas in which, for example, FFF8 and FFF7 are shown indicate the use states of the clusters 60 corresponding to the areas and are areas that are currently used.

FIG. 7B shows a case in which processing has been performed to reuse the previously used areas in the upper erasure area 61.

In order to reuse the previously used areas, processing as follows is performed. First, processing is performed to write accumulation data, stored in the currently used areas, to a writing-processing work area in the RAM 40. Next, processing is performed to control the flash memory 30 so as to perform erasure processing to erase all data in the upper erasure area 61. Next, processing is performed to control the flash memory 30 so as to perform writing operation to thereby return the accumulation data, saved to the RAM 40, to the upper erasure area 61.

As a result, the areas in which "0" has been written in the upper erasure area 61 become areas in which FFFF is written.

FIG. 7C shows a case in which processing is performed to reuse the previously used areas in the middle erasure area 61. Processing that is similar to that performed on the upper erasure area 61 is performed on the middle erasure area 61, so that the areas in which "0" has been written in the middle erasure area 61 become areas in which FFFF is written.

On the other hand, processing that is similar to that described with reference to FIG. 7B is also performed on the accumulation-data storage section 66 in the FAT-file system area 32. As a result, the accumulation data in the currently used clusters 60 is maintained. FFFF is also written to the previously used clusters 60.

A description is now given of the reusing process 74 (described with reference to FIGS. 3 and 7A to 7C) in which, when all areas in the accumulation-data storage section 66 and the table section 64 are in the states in which they were previously used or are currently used, the areas are reused.

That is, in the reusing process 74 shown in FIG. 3, when all areas in the accumulation-data storage section 66 and the table section 64 are in the state in which they were previously used or are currently used, the accumulation data in the currently used areas is maintained and FFFF is written to the previously used areas.

FIG. 8 shows how data in the entry section 65 is processed in the individual processes. The "individual processes" in this case refer to the initializing process 70, the writing processes 71 and 73, the data removing process 72, and the reusing process 74.

FIG. 8 shows the states of data input to file-name storage areas and the states of data in the file system 10 in the individual processes. Data processing state in the entry section 65, assuming that the number of file-name storage areas is two, will now be described with reference to FIG. 8.

The initializing process 70 is a process in which "1" is written to all bits belonging to the entry section 65 in the initial state. That is, as shown in FIG. 8, in the initializing process 70, input data "FFFFFFFFFFFFFFFFFFFF" and "FFFFFFFFFFFFFFFFFFFF" is written to the two filename storage areas. On the other hand, data having inverted logic of the aforementioned input data is input to file system 10.

The writing processes 71 and 73 are processes in which file information is written to the entry section 65 while avoiding areas in which "0" is written. That is, as shown in FIG. 8, in the writing processes 71 and 73, input data "BEBDBCDFDFDFDFABA7AB" and "BBBAB9DFDFDFDFDFABA7AB" is written to the entry section 65. On the other hand, data having inverted logic of the aforementioned input data is input to file system 10.

The data removing process 72 is a process in which, during removing of accumulation data from the clusters 60, "0" is written to all areas in which file information for a file constituted by accumulation data to be removed is stored. That is, as shown in FIG. 8, in the data removing process 72, input data "00000000000000000000000" is written to the second filename storage area. On the other hand, data having inverted logic of the aforementioned input data is written to the file system 10.

The reusing process 74 is a process in which, when all areas in the entry section 65 are in states in which they were previously used or are currently used, the areas are reused. In the reusing process 74, processing that is similar to that described with reference to FIG. 7B is performed on the entry section 65. That is, as shown in FIG. 8, in the reusing process 74, input data "FFFFFFFFFFFFFFFFFFFFFF" is written to the second file name storage area.

The data logic used in the above description is the same as the logic used during writing to the flash memory 30. Thus, data input to the file system 10 is data having inverted logic of the aforementioned data.

As described above, the management method according to the second embodiment includes: the initializing process 70 in which "1" is written to all bits belonging to the accumulation-area storage section 66 and the table section 64 in the initial state; the data removing process 72 in which, during removing of accumulation data from the clusters 60, "0" is written to all use-state-indicating areas in the table section 64 which correspond to the clusters 60; and the writing processes 71 and 73 in which accumulation data is stored in the clusters 60 while avoiding the clusters 60 corresponding to the use-state-indicating areas in which "0" is written in the table section 64, and use-state data is written to the table section 64.

When the above-described data management method is used for the flash memory 30, during additional writing of accumulation data that constitutes a file, an erasure operation is not concentrated on a particular area in the flash memory 30.

As described above, the management method according to the second embodiment includes the data removing process 72 in which, during removing of accumulation data from the clusters 60, "0" is written to all use-state-indicating areas in the table section 64 which correspond to the clusters 60, and the writing processes 71 and 73 in which accumulation data is stored in the clusters 60 while avoiding the clusters 60 corresponding to the use-state-indicating areas in which "0" is written in the table section 64, and use-state data is written to the table section 64. Thus, in the flash memory 30, not only areas that are currently used but also areas that were previously used are avoided to write accumulation data. Thus, an erasure operation is performed after all areas are used, without being performed each time accumulation data is added.

With this arrangement, the number of erasures decreases and the erasure operation is not concentrated on a particular area. This can prevent early deterioration of the flash memory 30 and allows the flash memory 30 to fulfill its intended lifespan.

[Third Embodiment]

A third embodiment is directed to a method for managing data in the file system according to the first embodiment. The management method according to the third embodiment includes: a process in which "1" is written to all bits belonging to at least the accumulation-area storage section 66 and the erasure-area management table 31 in the initial state; a process in which accumulation data is written to the clusters 60; a process in which cluster-use state data corresponding to the use states of the clusters 60 in erasure areas is written to the erasure-area management table 31; a process in which the clusters 60 in which additional accumulation data is to be stored are selected in accordance with the cluster use states and the accumulation data is additionally written to the selected clusters 60; a process in which cluster-use state data is written to the erasure-area management table 31 after the additional accumulation data writing; and a process in which, when it is determined based on cluster-use state data that additional storage data cannot be written, a data erasure operation is performed on erasure areas.

The process in which "1" is written to all bits belonging to at least the accumulation-data storage section 66 and the erasure-area management table 31 in the initial state is a process in which data in storage elements in the flash memory 30 is erased.

The process in which accumulation data is written and the process in which cluster-use state data is written will now be described with reference to FIG. 9. The process in which accumulation data is written is a process in which accumulation data is written to the clusters 60, and the process in which cluster-use state data is written is a process in which cluster-use state data corresponding to the use states of the clusters 60 in the erasure areas is written to the erasure-area management table 31.

Figure 9:
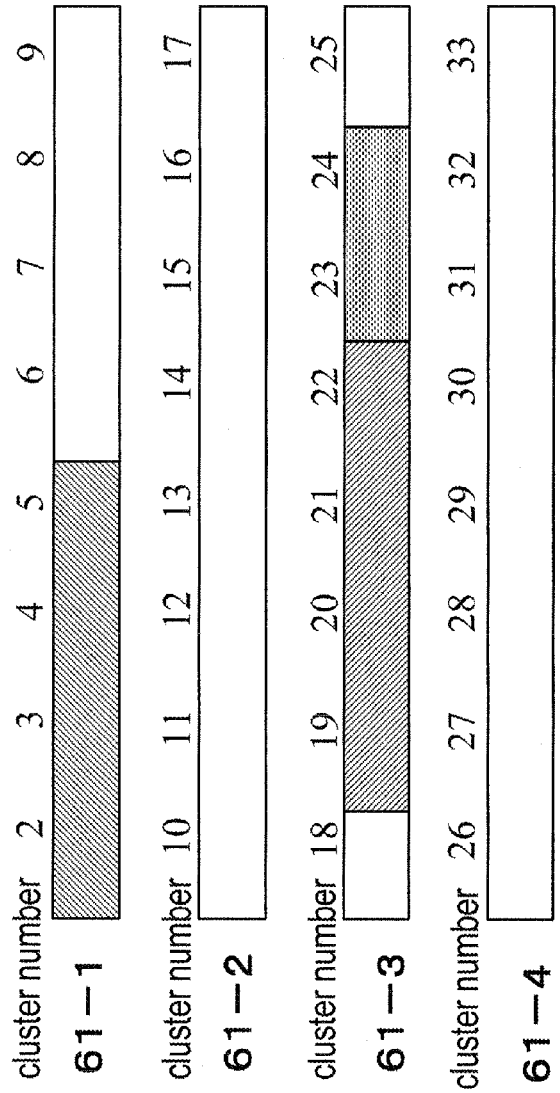
FIG. 9 illustrates a process in which accumulation data is written and a process in which cluster-use state data is written.

FIG. 9 shows data written to the erasure areas 61, the erasure-area management table 31, and the table section 64. FIG. 9 shows, of the multiple erasure areas 61, only erasure areas 61-1, 61-2, 61-3, and 61-4, for convenience of description of the processes. The erasure areas 61-1, 61-2, 61-3, and 61-4 include the clusters 60 indicated by cluster numbers 2 to 33. Data written to the FAT-file system area 32 indicates data written to the erasure areas 61-1, 61-2, 61-3, and 61-4. Needless to say, accumulation data written to the erasure areas 61-1, 61-2, 61-3, and 61-4 are inverted data of data input to the file system 10.

FIG. 9 shows that three files are accumulated in the clusters 60 indicated by cluster numbers 2 to 5, the clusters 60 indicated by 19 to 22, and the clusters 60 indicated by 23 and 24. With respect to the erasure area 61-1, cluster-use state data indicating "the number of files used is 1" and "a blank area is available", which indicates the accumulation state of accumulation data in the cluster 60, is written to the erasure-area management data 31. With respect to the erasure area 61-2, cluster-use state data indicating "the number of files used is 0" and "a blank area is available" is written. With respect to the erasure area 61-3, cluster-use state data indicating "the number of files used is 2" and "a blank area is available" is written. With respect to the erasure area 61-4, cluster-use state data indicating "the number of files used is 0" and "a blank area is available" is written.

File-constituting information "0003, 0004, 0005, FFF8" "0014, 0015, 0016, FFF8", and "0018, FFF8" is written to, in the table section 64, areas corresponding to the clusters 60 in which the accumulation data is written. The information "0003, 0004, 0005, FFF8" shows that accumulation data is accumulated in the clusters 60 indicated by cluster numbers 2 to 5. The information "0003, 0004, 0005" shows that data subsequent to the accumulation data written in the cluster 60 indicated by cluster number 2 is written to the clusters 60 indicated by cluster numbers 3, 4, and 5. The information "FFF8" shows that accumulation data stored in the cluster 60 indicated by cluster number 5 is the last accumulation data. "0014, 0015, 0016, FFF8" and "0018, FFF8" also represents similar information.

As described above, in the process in which accumulation data is written to the clusters 60, the data controller 17 inverts the logic of data input to the file system 10, converts the input data into accumulation data, and writes the accumulation data to the erasure areas 61 in the FAT-file system area 32. During the process, the accumulation data that constitutes one file is processed as one set of data.

A description is now given of the process in which the cluster-use state data corresponding to the use states of the clusters 60 in the erasure areas is written to the erasure-area management table 31. The erasure areas 61 refer to data areas that are expressed by logic addresses and that correspond to erasure units constituted by storage elements from which data is erased at a time when an erasure operation is performed on the flash memory 30. Each of the erasure areas 61 includes multiple clusters 60. Thus, the use states indicate whether or not a file constituted by the accumulation data is stored in the erasure areas 61 and whether or not a blank is available.

The use state data is created for each erasure area 61 and has data indicating whether or not a blank is available in the erasure areas 61 and data indicating the number of accumulated files. Thus, the process in which the cluster-use state data is written is a process in which data indicating whether or not a file is accumulated in the erasure areas 61 and data indicating the number of accumulated files are written to the erasure-area management table 31.

FIG. 10 shows data written to the erasure areas 61-1, 61-2, 61-2, 61-3, and 61-4, the erasure-area management table 31, and the table section 64 in the FAT-file system area 32. The data shown in FIG. 10 are analogous to the data shown in FIG. 9.

FIG. 10 shows that files are additionally written to the FAT-file system area 32 when it is in the file writing state shown in FIG. 9.

In FIG. 10, the additional files are written in the clusters 60 corresponding to cluster numbers 10 to 17 and the clusters 60 corresponding to cluster numbers 26 to 30. That is, the additional files are written in parts of the erasure areas 61-2 and 61-4. The cluster-use state data with respect to the erasure area 61-2 is changed to "the number of files used is 1" and "no blank area is available". The cluster-use state data with respect to the erasure area 61-4 is changed to "the number of files used is 1" and "a blank area is available".

File-constituting information "000B, 000C, 000D, 000E, 000F, 0010, 0011, 001A, 001B, 001C, 001D, 001E, FFF8" is further added to the table section 64.

The process in which accumulation data that constitutes the added files is written to the clusters 60 is a process in which the erasure areas 61 in which the cluster-use state data indicating "the number of used files is 0" and "a blank area is available" is written are searched for in the erasure-area management table 31 and accumulation data is written to the clusters 60 in the erasure areas 61.

The process in which the cluster-use state data corresponding to the use states of the clusters 60 in the erasure areas is written to the erasure-area management table 31 so as to corresponding to the writing of the accumulation data is a process in which data indicating whether or not a file is stored in the erasure areas 61 and data indicating the number of stored files are additionally written to the erasure-area management table 31.

Figure 11:
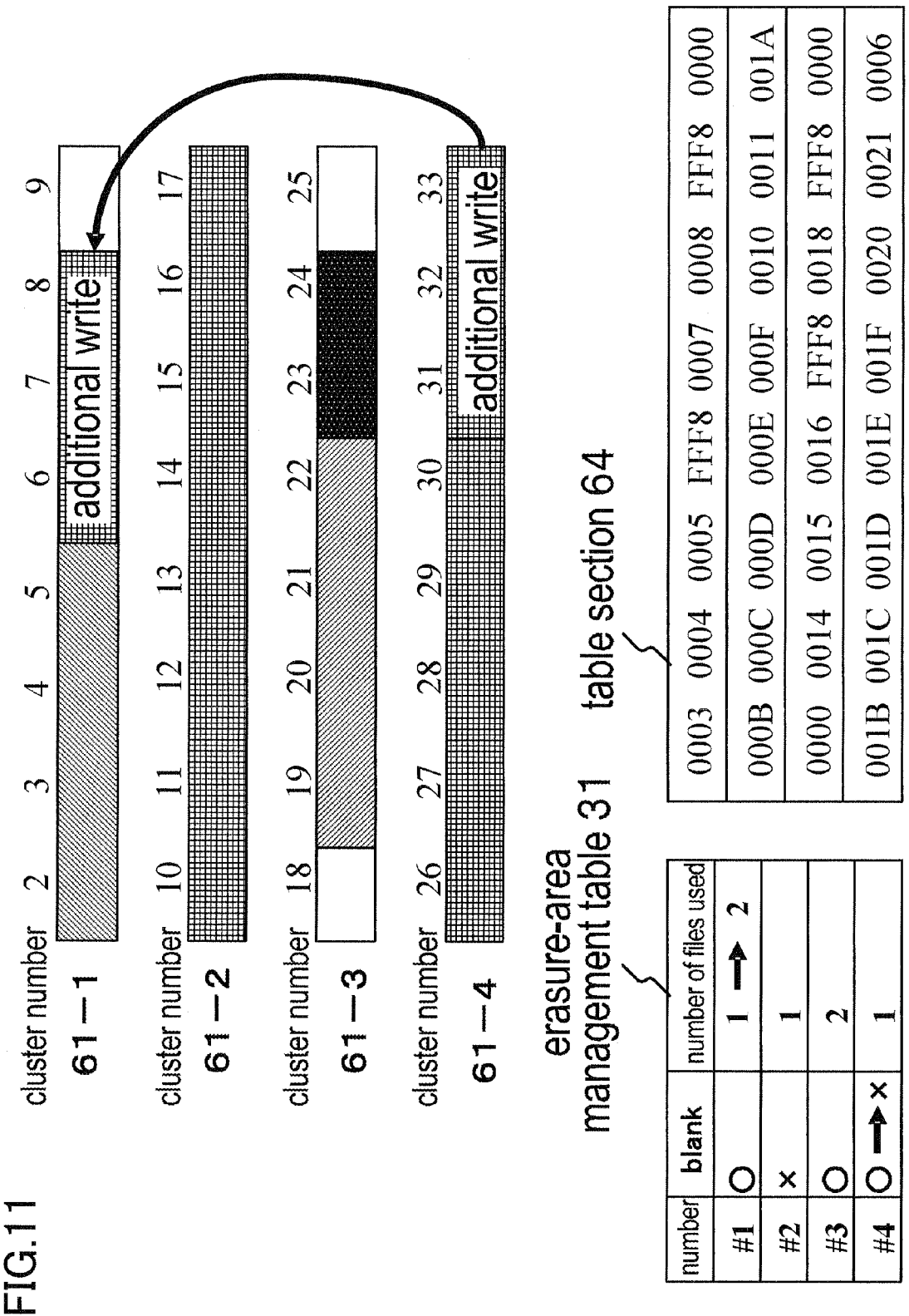
FIG. 11 shows a state in which addition of data of a fourth file is further written to the FAT-file system area in addition to the file writing process shown in FIG. 10.

FIG. 11 shows a state in which addition of the data of a fourth file is written to the FAT-file system area 32 in addition to the file writing process shown in FIG. 10.

FIG. 11 shows data written to the erasure areas 61-1, 61-2, 61-3, and 61-4, the erasure-area management table 31, and the table section 64 in the FAT-file system area 32. The written data is similar to the data shown in FIG. 9.

As shown in FIG. 11, the data of the additionally written file is that written to the clusters 60 corresponding to cluster numbers 31 to 33 and the clusters 60 corresponding to cluster numbers 6 to 8. That is, the data of the file is written in part of the erasure area 61-1 and part of the erasure area 61-4. More specifically, the additional data is written to a blank area in the erasure area 61-4 in which data of the fourth file is accumulated, the erasure area 61-4 corresponding to the last cluster number 30. That is, the data is written to the clusters 60 starting at cluster number 31. Even though data is written to all areas in the erasure area 61-4, data needs to be further written and thus the erasure-area management table 31 is referred to. When an erasure area having a blank area and a smallest number of files used is searched for from information in the erasure-area management table 31, the erasure area 61-1 is found. Thus, the file data is additionally written to the erasure area 61-1 and the cluster-use state data is changed to "the number of file used is 2" and "a blank area is available". The cluster-use state data with respect to the erasure area 61-4 is changed to "the number of files used is 1" and "no blank area is available".

In addition, file-constituting information "000B, 000C, 000D, 000E, 000F, 0010, 0011, 001A, 001B, 001C, 001D, 001E, 001F, 0020, 0021, 0006, 0007, 0008, FFF8" is added to the table section 64.

Figure 12:
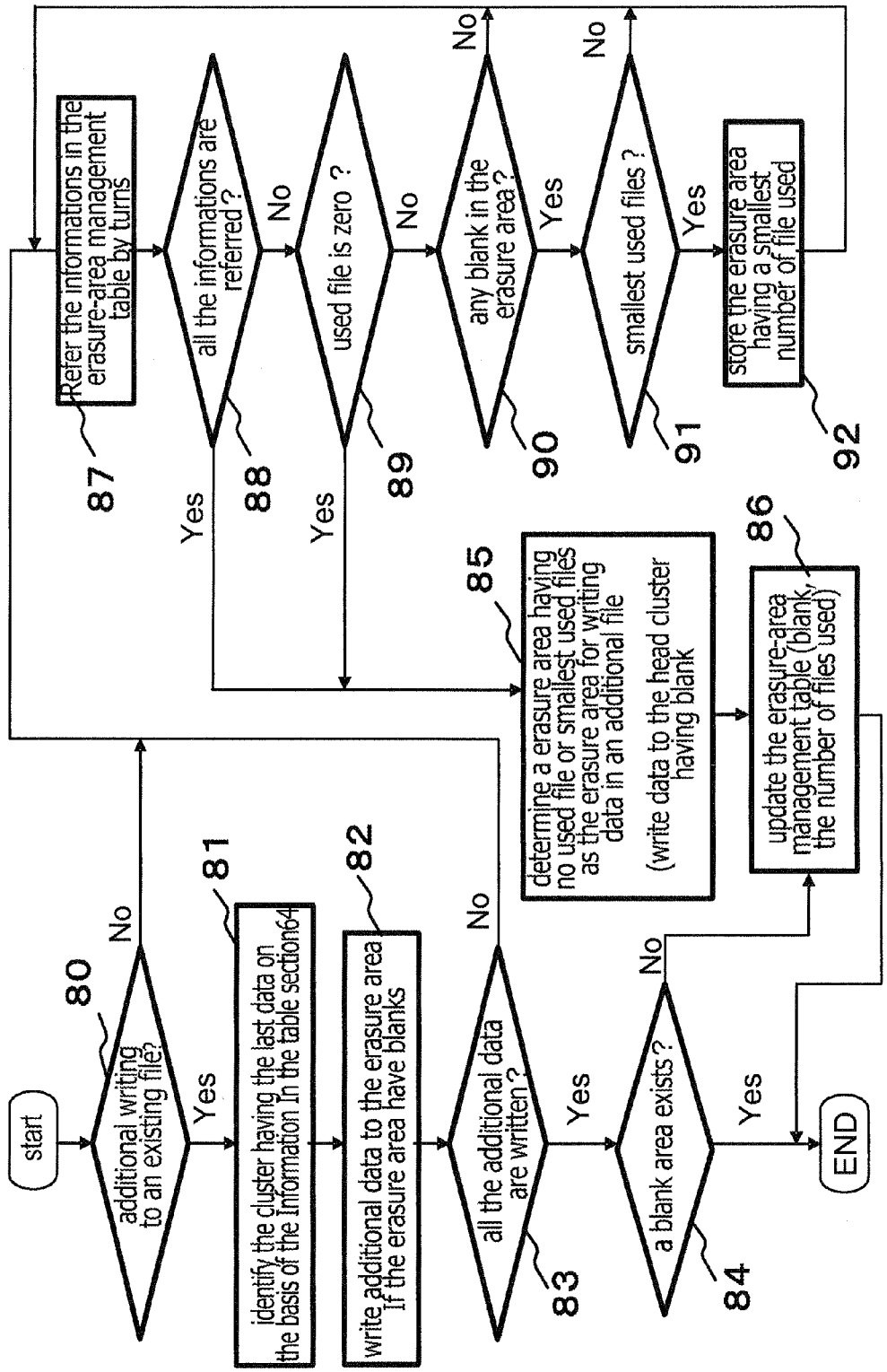
FIG. 12 is a flowchart showing processing for a process in which file data is additionally written to put the state into the state shown in FIG. 11.

Processing for the process in which file data is additionally written to put the state into the state shown in FIG. 11 will now be described with reference to the flowchart shown in FIG. 12. FIG. 12 shows a process in which cluster-use state data is written to the erasure-area management table 31 after additional accumulation-data writing involved in file-data addition.

As shown in FIG. 12, the process in which file data is additionally written includes steps 80 to 92. In step 80, a determination is made as to whether or not additional writing to an existing file is performed. In step 81, a cluster 60 in which the last data of the existing file exists is identified on the basis of information stated in the table section 64 in the FAT-file system area 32. In step 82, a determination is made as to whether or not a blank area exists in the erasure area 61 to which the cluster 60 in which the last data of the existing file exists belongs, and when a blank area is found, additional accumulation data is written to the erasure area 61. In step 83, a determination is made as to whether or not additional data has been written. In step 84, a determination is made as to whether or not a blank area exists after the writing of the additional data. In step 87, the erasure-area management table 31 is referred to when the additional data was not written. In step 89, a determination is made as to whether or not the number of files used is zero. In step 90, a determination is made as to whether or not a blank area exists in the erasure area 61. In step 91, a determination is made as to whether or not the erasure area 61 in question is an erasure area 61 in which the number of files used is the smallest. In step 92, the erasure area 61 having a smallest number of files used is stored. In step 88, the erasure-area management table 31 is referred to execute step 87 and steps 89 to 92. In step 85, the erasure area 61 in which the number of files used is zero or the smallest is determined, and an additional file is written to the erasure area 61. In step 86, the erasure-area management table 31 is updated. As a result of the above-described steps, as shown in FIG. 11, the file data is additionally written to a part in an erasure area 61-1 and a part in an erasure area 61-4. The cluster-use state data with respect to the erasure area 61-1 is changed to the "number of files used is 2" and "a blank area is available". The cluster-use state data with respect to the erasure area 61-4 is changed to the "number of files used is 1" and "no blank area is available".

According to the above-described process in which file data is additionally written, when file data is additionally written, additional accumulation data is written to a blank area in the erasure area 61 to which the file belongs, rather than re-writing the accumulation data that constitutes the file to the original clusters 60. When no blank area is available, the erasure-area management table 31 is referred to write the additional accumulation data to a blank area in another erasure area 61.

With this arrangement, there is no need to repeat the operation for erasing the erasure area 61 to which the cluster 60 belongs, in order to re-written accumulation data to its original cluster 60.

Step 86 in which the erasure-area management table 31 is updated is a process in which cluster-use state data is written to the erasure-area management table 31 after additional accumulation-data writing involved in addition of file data. As a result, as shown in FIG. 11, file-constituting information "000B, 000C, 000D, 000E, 000F, 0010, 0011, 001A, 001B, 001C, 001D, 001E, 001F, 0020, 0021, 0006, 0007, 0008, FFF8" is added to the table section 64.

Figure 13:
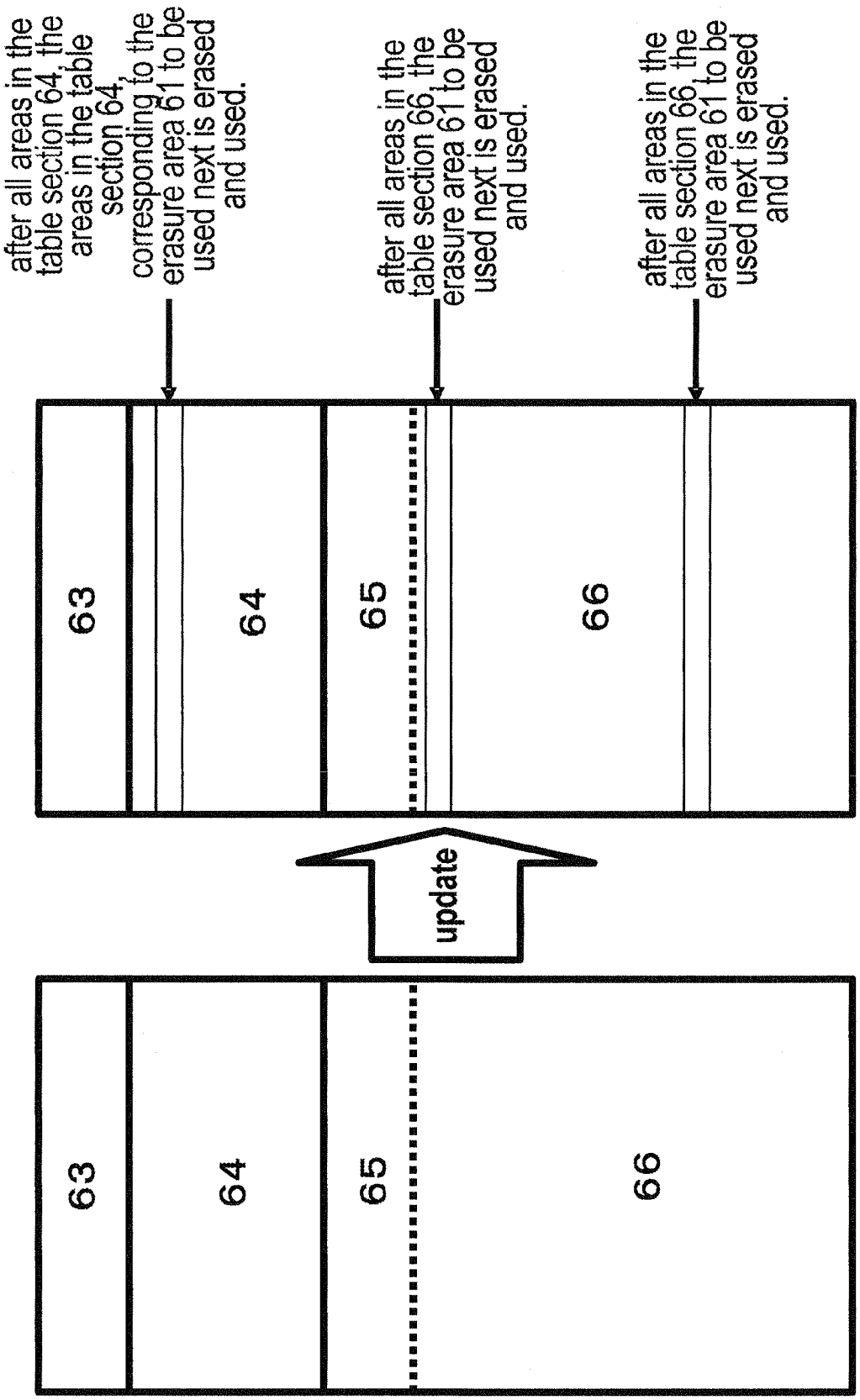
FIG. 13 shows the FAT-file system area and an erasure-area management table before reuse and the FAT file system and the erasure-area management table after reuse.

FIG. 13 shows the FAT-file system area 32 before reuse and the FAT-file system area 32 after refuse. The FAT-file system area 32 has the boot sector 63, the table section 64, the entry section 65, and the accumulation-data storage section 66, as described above.

In FIG. 13, the process in which data erasure processing is performed on the erasure areas when it is determined based on the cluster-use state data that additional accumulation data cannot be written is performed as follows. In the erasure-area management table 31, after all areas in the erasure-area management table 31 are used, each time an area to be used next in the erasure-area management table 31 changes to a next erasure area 61, the next erasure area 61 is erased and used. In the table section 64, after all areas in the table section 64 are used, each time an area corresponding to the cluster 60 to be used next changes to a next erasure area 61, the next erasure area 61 is erased and used. In the accumulation-data storage section 66, after all areas in each erasure area 61 are used, when the erasure area 61 is used next time, the erasure area 61 is erased and used. The management includes: a process in which "1" is written to all bits belonging to at least the accumulation-area storage section 66 and the erasure-area management table 31 in the initial state; a process in which accumulation data is written to the clusters 60; a process in which cluster-use state data corresponding to the use states of the clusters 60 in erasure areas is written to the erasure-area management table 31; a process in which the clusters 60 in which additional accumulation data is to be stored are selected in accordance with the cluster use states and the accumulation data is additionally written to the selected clusters 60; a process in which cluster-use state data is written to the erasure-area management table 31 after the additional accumulation data writing; and a process in which, when it is determined based on the cluster-use state data that additional storage data cannot be written, a data erasure operation is performed on erasure areas.

According to the process in which file data is additionally written, when file data is additionally written, additional accumulation data that constitutes a file is written to a blank area in the erasure area 61 to which the file belongs, rather than re-rewriting accumulation data that constitutes the file to the original cluster 60. When no blank area is available, the erasure-area management table 31 is referred to write the additional accumulation data to a blank area in another erasure area 61. For modification of file data, modified file data is written to a blank area and the table section 64 is updated.

Thus, there is no need to repeat the operation for erasing the erasure area 61 to which the file belongs in order to re-write file data to the original cluster 60. Consequently, the number of erasure operations decreases and the erasure operation does not concentrate on the particular erasure area 61. That is, the number of erasures of the erasure area decreases and deterioration for each erasure is delayed. As a result, it is possible to reduce the amount of deterioration caused by the erasure operation for the storage area in the flash memory 30.

In the above-described file system, the erasure operation does not concentrate on portions in the storage areas or the table section in the flash memory, and after all areas in the accumulation-data storage section are used, the erasure operation is performed. Thus, one aspect of the present invention provides a file system that has a smaller number of erasures of accumulation data in deletion areas and that has a long lifespan.

All examples and conditional language recited herein are intended for pedagogical purposes to aid the reader in understanding the invention and the concept contributed by the inventor to furthering the art, and are to be construed as being without limitation to such specifically recited examples and conditions, nor does the organization of such examples in the specification related to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A file system comprising:
    a data controller that inverts logic of input data to convert the input data into accumulation data;
    a nonvolatile storage that has storage areas in which the accumulation data is stored and a table section to which use states of the storage areas are written; and
    a controller that controls the nonvolatile storage so as to store the accumulation data in the storage areas in accordance with the use states written to the table section,
    wherein the controller comprises:
        an initiator for putting the table section into an initial state,
        a first writer for writing states of "0" to the table section in accordance with the use states of the storage areas in the nonvolatile storage, wherein the storage areas are arranged in an order of addresses in a state in which the accumulation data is additionally written,
        a selector for selecting the storage areas in which the accumulation data is to be stored, in accordance with the states of "0" in the table section,
        a second writer for writing the accumulation data to the selected storage areas, and a controller for performing control so as to erase the accumulation data in the storage areas when all of the storage areas are used.

2. The file system according to claim 1, wherein the table section comprises use-state-indicating areas to which states of "0" are written in accordance with the use states of the storage areas, and wherein, when "0" is written in bits in the use-state-indicating areas, the selector selects the storage areas while avoiding the storage areas corresponding to the use-state-indicating areas in which "0" is written.

3. A data management method for a file system having a nonvolatile storage that has storage areas in which accumulation data is stored and a table section to which use states of the storage areas are written, and a controller that performs control so as to store the accumulation data in the storage areas in accordance with the use states written to the table section, the method comprising:

initializing by writing "1" to bits belonging the storage areas and the table section;

removing data by writing, during removing of the accumulation data from the storage areas, "0" to all bits in the use-state-indicating areas in the table section, the use-state-indicating areas corresponding to the storage areas;

arranging the storage areas in an order of addresses in a state in which the accumulation data is additionally written;

selecting the storage areas in which the accumulation data is to be stored avoiding the storage areas corresponding to the use-state-indicating areas in which "0" is written in the table section and storing the accumulation data to the selected storage areas; and writing the use states to the table section.

4. The data management method according to claim 3, further comprising:

writing "1" to bits belonging to the storage areas when all the storage areas are in states in which "0" is written or the accumulation data is stored.

5. A data management method for a file system having a nonvolatile storage that has storage areas in which accumulation data is stored, erasure areas including the storage areas, and an erasure-area management table to which use states of the storage areas are written, and a controller that performs control so as to store the accumulation data in the storage areas in accordance with the use states written to the erasure-area management table, the method comprising:

writing "1" to all bits belong to the storage areas in which the accumulation data is stored and the erasure-area management table;

writing the accumulation data to the storage areas;

writing, to the erasure-area management table, use-state data corresponding to the use states of the storage areas in the erasure areas;

arranging the storage areas in an order of addresses in a state in which the accumulation data is additionally written;

selecting a blank area in the erasure-area as the storage areas in which the accumulation data is to be stored, in accordance with the use-state data, and writing the accumulation data to the selected storage areas; and writing the use-state data to the erasure-area management table after the writing of the accumulation data.

6. The data management method according to claim 5, further comprising:

performing data erasure operation on the erasure areas when it is determined based on the use-state data that the accumulation data cannot be written.

\* \* \* \* \*